United States Patent
Schroeter et al.

(10) Patent No.: US 11,712,833 B2
(45) Date of Patent: Aug. 1, 2023

(54) SORTING DEVICE AND FEED RAIL FOR PLASTIC PREFORMS

(71) Applicant: KRONES AG, Neutraubling (DE)

(72) Inventors: Carsten Schroeter, Pfatter (DE); Juergen Beautl, Sinzing (DE); Dieter Wuensche, Straubing (DE)

(73) Assignee: KRONES AG

( * ) Notice: Subject to any disclaimer, the term of this patent is extended or adjusted under 35 U.S.C. 154(b) by 234 days.

(21) Appl. No.: 17/253,003

(22) PCT Filed: Jun. 18, 2019

(86) PCT No.: PCT/EP2019/066081
§ 371 (c)(1),
(2) Date: Dec. 16, 2020

(87) PCT Pub. No.: WO2020/011497
PCT Pub. Date: Jan. 16, 2020

(65) Prior Publication Data
US 2021/0114279 A1    Apr. 22, 2021

(30) Foreign Application Priority Data

Jul. 11, 2018    (DE) .................... 10 2018 116 841.1

(51) Int. Cl.
*B29C 49/42*    (2006.01)
*B65G 51/03*    (2006.01)
(Continued)

(52) U.S. Cl.
CPC .............. *B29C 49/06* (2013.01); *B29C 49/36* (2013.01); *B29C 49/42122* (2022.05); *B29C 49/68* (2013.01); *B29L 2031/712* (2013.01)

(58) Field of Classification Search
CPC .......... B29C 49/4205; B29C 49/42065; B29C 49/42097; B29C 49/42093; B65G 51/035; B65G 21/2072
See application file for complete search history.

(56) References Cited

U.S. PATENT DOCUMENTS

| 7,431,150 | B2 | 10/2008 | Ranger ....................... 198/836.3 |
| 8,851,806 | B2 | 10/2014 | Beutl et al. .......... B65G 51/035 |
| 10,875,718 | B2 * | 12/2020 | Salomon ............ B65G 21/2072 |
| 2003/0164280 | A1 | 9/2003 | Delaporte et al. ......... 198/836.3 |
| 2008/0196998 | A1 | 8/2008 | Lemaistre et al. ......... 198/469.1 |

FOREIGN PATENT DOCUMENTS

| DE | 19915356 A1 * | 10/2000 | ............... B07C 5/07 |
| DE | 203 08 513 | 8/2004 | ............. B29C 49/42 |

(Continued)

OTHER PUBLICATIONS

Mechanical translation of WO 2006/058512 A2 dated Jun. 2006. (Year: 2006).*
Mechanical translation of DE 19915356 A1 dated Oct. 2000. (Year: 2000).*

(Continued)

*Primary Examiner* — Robert B Davis
(74) *Attorney, Agent, or Firm* — Hayes Soloway P.C.

(57) ABSTRACT

Apparatus for transporting plastic preforms, has a sorting device configured for sorting plastic preforms and a transport device arranged after the sorting device in a transport direction. The transport device includes a first support rail and a second support rail for carrying the plastic preforms between the first and second support rails along the direction of transport. The sorting device has two rollers spaced apart from one another, between which the plastic performs are guided.
The apparatus has an adjustment mechanism for adjusting at least one lateral spacing of the support rails, wherein this (Continued)

adjustment mechanism has several adjustment units which are arranged one behind the other along the transport direction, wherein these adjustment units each enable an adjustment of the lateral spacing and wherein these adjustment units are mechanically coupled such that the adjustment units can be adjusted together.

20 Claims, 5 Drawing Sheets

(51) Int. Cl.
*B65G 21/20* (2006.01)
*B29C 49/06* (2006.01)
*B29C 49/36* (2006.01)
*B29C 49/68* (2006.01)
*B29L 31/00* (2006.01)

(56) References Cited

FOREIGN PATENT DOCUMENTS

| DE | 10 2009 016 593 | 10/2010 | ............. B29C 49/48 |
| EP | 2 604 411 | 6/2013 | ............. B29C 49/42 |
| WO | WO-2006058512 A2 * | 6/2006 | ......... B29C 49/4205 |

OTHER PUBLICATIONS

German Search Report issued in German Patent Appln. No. 10 2018 116 841.1, dated Apr. 12, 2019, with machine English translation, 12 pages.

International Search Report (with English translation) and Written Opinion issued in PCT/EP2019/066081, dated Sep. 2, 2019, 12 pages.

* cited by examiner

Fig. 1a

PRIOR ART

Fig. 1b

PRIOR ART

SORTING DEVICE AND FEED RAIL FOR PLASTIC PREFORMS

The present invention relates to an apparatus for manufacturing plastic containers. It is known that so-called plastic preforms are first heated and then formed into plastic containers in a heated state. In this case, plastic preforms are usually first sorted, for example starting from a loose bulk, and then fed in a sorted state to a heating device. In the prior art preform feed rails are used for this purpose, which represent the remaining element between, for example, a sorting device, such as a roller sorter, and a blowing machine, for example the oven of the blowing machine.

It is therefore known in the prior art that different plastic preforms can be processed by one machine. Depending on the plastic preforms to be processed, the distance, for example, of the carrying rails of these transport devices, the height of a possible downholder and, if available, the opening widths of a guide for the plastic preforms must be adjusted. This setting or adjustment is carried out in the prior art by using manually operated adjustment units. In some cases, adjustment units or individual adjustment units are used for each fixing or suspension point of these mentioned elements. Up to 21 adjustment units can be installed in one feed rail.

On a feed rail known from the applicant's internal prior art, the adjustment units described in the prior art must be individually set manually to the required values. In the case of a fully equipped feed rail, manual setting work on up to 21 setting units is necessary, partially even in several steps. This is very time-consuming, and in addition, the settings require great care to ensure reliable operation. Due to the decentralised arrangement of the adjustment units along the feed rail, they are not always easy to reach. Partially it is possible to work standing on the floor, but partially a ladder with several steps is required and partially you have to bend over a railing, for example a platform of a roller sorter, to reach the units. This creates additional accident risks.

In addition, alignment and lining up of the plastic preforms from a loose bulk material into a regular arrangement takes place in a roller sorter according to the prior art. The aligned plastic preforms are then fed to a blow-moulding machine via the outlet set and the feed rail. In the roller sorters, a roller distance and, for example, a kicker wheel or a guide tongue must be specified and set specifically for each geometry of the plastic preforms.

In the prior art, these settings are made manually. From the internal prior art of the applicant, a roller sorter is known in which the adjustment of a roller distance to each other is carried out on one side, i.e. only one of these rollers is moved, which can be done, for example, by means of a handwheel and a counter. A mechanical movement of an adjusting wheel is transmitted here for example via a king shaft to trapezoidal spindles of linear units. Especially in machines with several plastic preforms, the manual adjustment activities lead to incorrect values, which have a negative influence on the restart behaviour and production after a change-over process. In addition, the change-over activities take up working time.

The object of the present invention is therefore to simplifying such reorientations of a corresponding apparatus and preferably also to make them more precise. According to the invention, these tasks are achieved by the subject-matter of the independent patent claims. Advantageous embodiments and modifications are the subject matter of the sub-claims.

An apparatus according to the invention for transporting plastic preforms according to the invention has a sorting device which is suitable and intended for sorting plastic preforms and which transports the plastic preforms in a predetermined transport direction. Furthermore, a transport device is provided which is arranged after the sorting device in the transport direction, wherein this transport device having a first support rail for carrying the plastic preforms and a second support rail for carrying the plastic preforms, and the plastic preforms being transportable between this first support rail and the second support rail. These support rails extend along the direction of transport, wherein the sorting device having two rollers spaced from each other between which the plastic preforms can be guided.

According to the invention, the device has an adjustment mechanism for adjusting at least one lateral spacing of these support rails, wherein this adjustment mechanism has several adjustment units which are arranged one behind the other along the direction of transport, wherein these adjustment units each enable an adjustment of the lateral spacing and wherein these adjustment units are coupled to one another, in particular mechanically, in such a way that the adjustment units can be adjusted together. In this way it is possible to change centrally, for example, the distance between these two support rails. In this way it is possible to change the apparatus to different plastic preforms. It is possible, for example, that this adjustment mechanism has a spindle drive or a toothed rack or similar mechanical elements.

However, it would also be conceivable that each of the adjustment units has its own drive and that these drives are controlled together. In this way, there would be a coupling between the drives and thus also between the adjustment units on the control side.

In another advantageous design, the adjustment units are coupled together by means of at least one mechanical coupling device.

In a further advantageous embodiment, the coupling device has at least one rod-like body that can be rotated or moved along its longitudinal direction. Advantageously, this are coupling rods, which are rotatable and which can act advantageously on the individual adjustment units, for example via gear teeth. In this way, several adjustment units can be changed simultaneously and in the same way, for example by a central adjustment unit or a central adjustment device. Preferably, these adjustment units can have gearwheel mechanisms which can be driven by a central shaft. This gearwheel mechanism can, for example, have a bevel gearwheel.

In a further advantageous embodiment, the apparatus has a drive device for driving the adjustment units. Thus, for example, one or, if necessary, several central motors can be provided, which can effect the adjustment on several adjustment units.

It is thus proposed that the individual adjustment units of a plastic preform feed rail be replaced by a central adjustment unit. In doing so, mechanical adjustment units can be installed, for example, at the suspension points of the support rails, a downholder or, if necessary, a plastic preform guide, which are preferably coupled to each other and can then be adjusted from a central point. The mechanical adjustment units are preferably designed as linear units, the adjustment is carried out preferably mechanical, for example via a spindle drive. Other designs, such as toothed racks or similar, are also conceivable.

The adjustment units can be coupled mechanically with a continuous shaft for each functional element (support bar, downholder or guide device).

In this way it is possible to achieve that a maximum of five adjustment units can be set at an easily accessible point on a feed rail. This point can, for example, be at an upper or lower end of the rail.

Additionally, a central electromotive adjustment can be provided, for example at two, three, four or five points. As an option, it would also be conceivable to provide decentralised compact electromotive adjustment units, whose coupling and synchronisation is preferably effected via a system control.

The procedure proposed here can significantly reduce the time required for manual adjustment by combining the adjustment units (for example, from a maximum of 25 units to 5 units). This means that there is still the possibility of optional automatic adjustment.

In a further advantageous embodiment, the transport device has a downholder element which extends at least in sections along the transport direction and which is preferably also adjustable by the adjustment mechanism. Here again, it would be possible for several adjustment units to act on this downholder element and these adjustment units could again be adjusted centrally.

In a further advantageous embodiment, the transport device has guide elements to guide the bodies of the plastic preforms. These can be, for example, guide rails, which are preferably arranged below the support rails. Preferably, these guide elements can also be adjusted by the adjustment mechanism. Here too, it is possible that the adjustment mechanism acts on these guide elements via several adjustment units.

In a further preferred embodiment, the support rails, the guide elements and the hold-down element are individually adjustable. However, a central adjustment is also possible and preferred.

In a further advantageous embodiment, the lateral distance of the above mentioned rollers of the sorting device can also be changed. In this case a drive can be provided, in particular a motor, hydraulic, pneumatic and/or magnetic drive, by means of which this distance can be changed. The lateral distance is understood to be the distance between the two axes of rotation of these rollers.

In a further advantageous embodiment, the transport device is suitable and intended for horizontal transport of a plastic preform to be transported, in particular between the sorting device and a heating device. Preferably, the transport device is suitable and intended to pick up and/or take over plastic preforms from the sorting device, in particular from the roller sorter, and to transport them in horizontal transport direction at least in sections and preferably up to a heating device, in particular an oven. Preferably, the transport direction in which the transport device transports the plastic preforms extends in horizontal direction.

Preferably, the transport device has an stressing device which is suitable and intended to act upon the plastic preforms to be transported with a fluid medium and in particular with compressed air (in particular on a rear outer wall of the plastic preform to be transported, preferably seen in the transport direction) and thus to transport the plastic preforms to be transported. Preferably, the plastic preforms are accelerated and/or moved along the transport direction by the application of a fluid medium, in particular compressed air. Preferably, the admission device has a plurality of transport nozzles through which the fluid medium, in particular compressed air, by means of which a plastic preform to be transported is applied, emerges.

Preferably, the first support rail for carrying the plastic preforms and/or the second support rail for carrying the plastic preforms (in particular exclusively) is/are arranged in a (common) horizontal plane. Preferably the first and/or the second support rail and in particular all support rails of the transport device do not form a slope. The infeed area, at which the transport device takes over a plastic preform to be transported (in particular from the sorting device), is preferably arranged in the same horizontal plane as a discharge area of the transport device, at which the transported plastic preform is discharged from the transport device and in particular transferred to a heating device.

Preferably, the transport device is a horizontal conveyor which is arranged in the transport direction, preferably directly after the sorting device and/or in an outlet area of the sorting device and which preferably takes over plastic preforms from the sorting device. Preferably, the horizontal conveyor is arranged in front of a heating device, seen in the transport direction, and in particular the plastic preforms transported by the transport device are transferred (directly) to the heating device.

Preferably, the preforms or plastic preforms are transported horizontally between the sorting device, which is designed in particular as a roller sorter, and a heating device, which is designed in particular as an oven, wherein the preforms or plastic preforms are preferably moved by applying compressed air.

Please note that the embodiments described below can be combined with the embodiments described here above, in particular to facilitate the overall operation of the apparatus described here.

The present invention is further directed to a method for transporting plastic preforms, wherein the plastic preforms are sorted by means of a sorting device, transported with a transport device arranged downstream of the sorting device in the transport direction and wherein this transport device comprises a first support rail for carrying the plastic preforms and a second support rail for carrying the plastic preforms and wherein the plastic preforms are transported between this first support rail and this second support rail and wherein these support rails extend along the transport direction, wherein the sorting device preferably comprises two rollers spaced from each other between which the plastic preforms are transported.

According to the invention, the apparatus has an adjustment mechanism for adjusting at least one lateral spacing of these support rails, wherein this adjustment mechanism has several adjustment units which are arranged one behind the other along the transport device, wherein these adjustment units each enable an adjustment of the lateral spacing (i.e. a spacing which is perpendicular to the longitudinal directions of the respective elements) and wherein the adjustment units are mechanically coupled to one another in such a way that the adjustment units can be adjusted together.

Therefore, an at least partially centralised adjustment of the adjustment units and thus also of the aforementioned support rails is also proposed on the procedural side.

Preferably, the transport of the plastic preforms, in particular the plastic preforms to be transported by the transport device, is horizontal. Preferably, the plastic preforms are transported horizontally after the sorting device at least in sections and preferably between the sorting device, which is designed in particular as a roller sorter, and a heating device, which is preferably designed as an oven and which particularly preferentially heats the plastic preforms before and in particular for their expansion into plastic containers.

Preferably, the plastic preforms transported by the transport device are applied with fluid medium and in particular with compressed air, in particular during their horizontal transport. Preferably the plastic preforms are moved by applying compressed air, which causes a transport in horizontal transport direction. Preferably, the plastic preforms to be transported by the transport device are accelerated with compressed air, in particular exclusively with compressed air, and particularly preferably thereby moved away from the sorting device, in particular from an outlet area of the sorting device in the transport direction (in particular horizontally), preferably transported to a heating device (in particular an oven). Preferably at least one area of a plastic preform is transported between the sorting device and the heating device (exclusively) in a horizontal plane.

As mentioned above, the apparatus according to the invention also has a sorting device, in particular in the form of a so-called roller sorter. Also a changeover of this roller sorter is partly complex.

The present invention is therefore further directed towards an apparatus for transporting plastic preforms with a sorting device which is suitable and intended for sorting plastic preforms and which transports the plastic preforms in a predetermined transport direction, and with a transport device arranged after the sorting device in the transport direction, wherein said transport device comprises a first support rail for carrying the plastic preforms and a second support rail for carrying the plastic preforms, and the plastic preforms are transportable between said first support rail and said second support rail, wherein said support rails extend along the transport direction, and wherein the sorting device comprises two rollers spaced from each other between which the plastic preforms are guidable. It is advantageous that these two rollers can each be rotated with respect to their longitudinal direction. According to the invention, the apparatus has an adjustment mechanism for adjusting at least one lateral spacing of the carrier rails and the rollers of the sorting device are also adjustable with respect to each other, wherein the sorting device preferably having a drive device for adjusting the rollers.

Furthermore, it is particularly preferred that a lateral distance between these rollers can be changed. This change in distance can be made in particular in reaction to another type of plastic preforms.

It is conceivable that only the position of one roll is changed. It is preferable to change the distance between the two rollers equally, i.e. the rollers preferably remain parallel to each other before and after a changeover. It is therefore preferable that the rollers are shifted parallel to each other.

In a further advantageous embodiment, the drive unit has a motor drive. It is therefore suggested that the adjustment of at least one and preferably both rollers occurs motorised.

In the prior art, currently these changeovers must be carried out manually. Usually, an adjustment of a roller spacing is carried out on one side, i.e. only one roller is moved, preferably by means of a handwheel and a counter. A mechanical movement of an adjusting wheel can be transmitted via a king shaft to the trapezoidal spindles and linear units. In particular, in the case of machines with several types of plastic preforms to be treated, these manual adjustment operations lead to incorrect values in the applicant's internal prior art, which have a negative impact on restart behaviour and production after a changeover procedure.

In addition, these changeover activities require working time. It is therefore proposed within the scope of this invention that the distance between the rollers is infinitely variable, in particular by means of a motor drive. Thus, for example, a rotating movement of a drive shaft for mechanical transmission elements such as bevel gears, a king shaft or spindle units can be transferred to a linear unit, on whose displaceable slides the roller displacements of the sorting rollers are arranged.

To implement this described function, the use of different linear units such as for example tapered recirculating guides, trapezoidal guides, slide bearings, etc. is also conceivable. In addition, a variety of well-known elements from drive technology can also be used, such as toothed belts, circumferential shafts with bevel gears, toothed racks, motorised or pneumatic drives and the like.

It would also be conceivable to provide individually driven linear units which are coupled in terms of control, in particular to ensure synchronous running and parallelism of the rollers.

The automatic reel adjustment described above offers the advantage of reducing manual processes and improving ergonomics during a corresponding product changeover. In this way, errors can be avoided and the reproducibility of the preform specific defined setting values of a roller spacing is substantially improved.

In particular in combination with an automatically adjustable infeed rail and a change-over package, automatic reel adjustment is also conceivable, thus leading to an effective product change. Preferably, both the design described above as well as the design described here can be used to achieve an automated or semi-automated changeover to different plastic preforms. In addition, the faultlessly reproducible settings enable a quick restart of a production without long adjustment and settling phases of the system.

The invention is also conceivable in particular in connection with higher-level control systems. In a further preferred embodiment, it is also conceivable that an adjustment of the rollers of the roller sorters and/or the above described feed rails of the plastic preforms is carried out by motor and/or pneumatically. In addition, a recipe-dependent changeover can also be carried out.

In a further advantageous embodiment, the apparatus has a control unit which enables a recipe depending adjustment of the feed rails for the plastic preforms, the rollers of the roller sorter as well as a change, if necessary, of a set-package between the roller sorter and the feed rail for the plastic preforms.

It would also be conceivable to provide for a (fully) automatic changeover of the individual components, i.e. both the rollers and the subsequent transport device.

In a further advantageous embodiment, the apparatus has a bearing device by means of which at least one roller is supported in such a way that this roller can be moved perpendicularly to its longitudinal direction. Preferably, the roller can also be moved perpendicular to its axis of rotation.

In a further preferred embodiment, both rollers can be slidable. In this way it would be possible to maintain a transport path of the plastic preforms and at the same time change the distance between the rollers, for example to be able to treat plastic preforms with larger or smaller cross-sections.

In a further preferred embodiment, the apparatus has a discharge mechanism to eject individual plastic preforms from their transport path. For example, a so-called kicker wheel can be provided to eject incorrectly oriented plastic preforms from the transport path. In a further preferred embodiment, the positioning of this ejection mechanism can also be adjusted and in particular adjusted to different geometries of the plastic preforms.

In a further advantageous embodiment, an adjustment mechanism for adjusting the rollers and an adjustment mechanism for adjusting the guide rails are coupled together. This coupling can also be done electronically, for example via a control device. However, a mechanical coupling would also be conceivable. With this preferred design, a complete changeover of the entire sorting and transport process can be carried out together.

In a further advantageous embodiment, the drive device for adjusting the rollers has coupling elements and/or power transmission elements selected from a group of coupling elements and/or power transmission elements which includes trapezoidal spindles, kingpins, bevel gears, spindle units, recirculating ball guides, trapezoidal guides, slide bearings, circumferential shafts and the like.

In a further advantageous embodiment, the transport device is suitable and intended for horizontal transport of a plastic preform to be transported, in particular between the sorting device and a heating device. Preferably, the transport device is suitable and intended to pick up and/or take over plastic preforms from the sorting device, in particular from the roller sorter, and to transport them in horizontal transport direction at least in sections and preferably up to a heating device, in particular an oven. Preferably, the transport direction in which the transport device transports the plastic preforms extends in horizontal direction.

Preferably, the transport device has a stressing device which is suitable and intended to apply the plastic preforms to be transported with a fluid medium and in particular with compressed air (in particular on a rear outer wall of the plastic preform to be transported, preferably seen in the transport direction) and thus to transport the plastic preforms to be transported. Preferably, the plastic preforms are accelerated and/or moved along the transport direction by the application of a fluid medium, in particular compressed air. Preferably, the stressing device has a plurality of transport nozzles through which the fluid medium, in particular compressed air, by means of which a plastic preform to be transported is applied, emerges.

Preferably, the first support rail for carrying the plastic preforms and/or the second support rail for carrying the plastic preforms (in particular exclusively) is/are arranged in a (common) horizontal plane. Preferably the first and/or the second support rail and in particular all support rails of the transport device do not form a slope. The infeed area, at which the transport device takes over a plastic preform to be transported (in particular from the sorting device), is preferably arranged in the same horizontal plane as a discharge area of the transport device, at which the transported plastic preform is discharged from the transport device and in particular is transferred to a heating device.

Preferably, the transport device is a horizontal conveyor which is arranged in the transport direction, preferably directly after the sorting device and/or in an outlet area of the sorting device and which preferably takes over plastic preforms from the sorting device. Preferably, the horizontal conveyor is arranged in front of a heating device, seen in the transport direction, and in particular the plastic preforms transported by the transport device are transferred (directly) to the heating device.

Preferably, the preforms or plastic preforms are transported horizontally between the sorting device, which is designed in particular as a roller sorter, and a heating device, which is designed in particular as an oven, wherein the preforms or plastic preforms are preferably moved by applying compressed air.

The present invention is further directed to a method for transporting plastic preforms, wherein the plastic preforms are sorted by a sorting device and transported by a transport device arranged after the sorting device in the transport direction, wherein said transport device comprising a first support rail for carrying the plastic preforms and a second support rail for carrying the plastic preforms and the plastic preforms being transported between said first support rail and said second support rail, wherein said support rails extending along the transport direction, wherein said sorting means comprising two rollers spaced from each other between which the plastic preforms are transported.

According to the invention, the apparatus has an adjusting mechanism for adjusting at least one lateral distance of these support rails, and at least at times a lateral distance of the rollers from each other is changed, in particular with the aid of a drive device. It is therefore also suggested on the process side that a driven or motorised change of a distance between the rollers is made.

Preferably, the transport of the plastic preforms, in particular the plastic preforms to be transported by the transport device, is horizontal. Preferably, the plastic preforms are transported horizontally after the sorting device at least in sections and preferably between the sorting device, which is designed in particular as a roller sorter, and a heating device, which is preferably designed as an oven and which particularly preferentially heats the plastic preforms before and in particular for their expansion into plastic containers.

Preferably, the plastic preforms transported by the transport device are applied with fluid medium and in particular with compressed air, in particular during their horizontal transport. Preferably the plastic preforms are moved by applying compressed air, which causes in particular a transport in horizontal transport direction. Preferably, the plastic preforms to be transported by the transport device are accelerated with compressed air, in particular exclusively with compressed air, and particularly preferably thereby moved away from the sorting device, in particular from an outlet area of the sorting device in the transport direction (in particular horizontally), preferably transported to a heating device (in particular an oven). Preferably at least one area of a plastic preform is transported between the sorting device and the heating device (exclusively) in a horizontal plane.

Further advantages and embodiments are shown in the attached drawings:

In the drawings:

FIG. 2 shows an illustration of a transport device according to the invention with manual adjustment facility in;

Figure 1A:
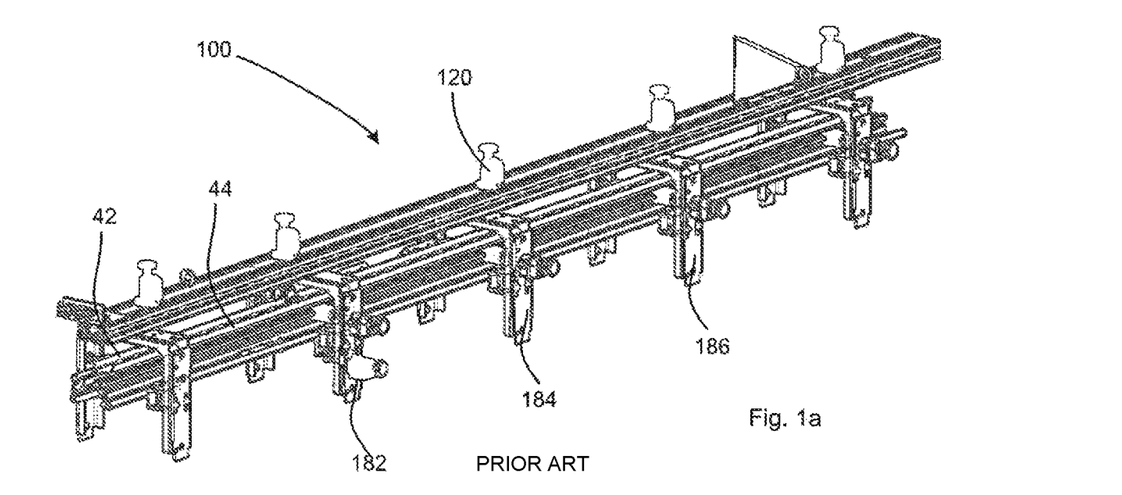
FIG. 1a, 1b show two representations of a transport device according to the prior art.
Figure 1B:
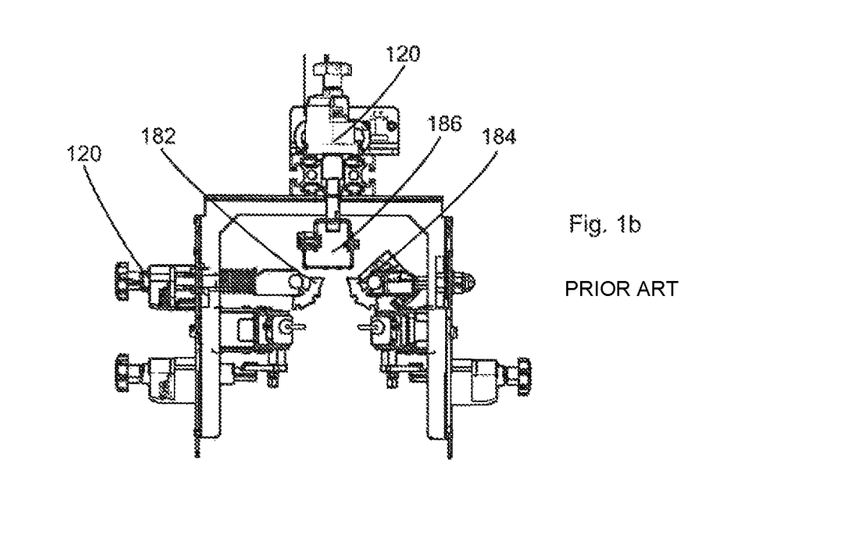

FIGS. 1a and 1b show two representations of a transport device for transporting plastic preforms according to the prior art. It can be seen here that the device has a number of adjustment units 182, 184, 186. Each of these has several actuators 120, with which separate adjustment at the different points is possible. In this way, the entire adjustment is relatively complex.

FIG. 1b shows a sectional view of the device shown in FIG. 1a. Here again, the guide rails 182, 184 and the downholder element 186 can be seen. These elements can in each case be adjusted separately from each other. In this way, the prior art results in a relatively high effort to changeover to different geometries of plastic preforms.

Figure 2:
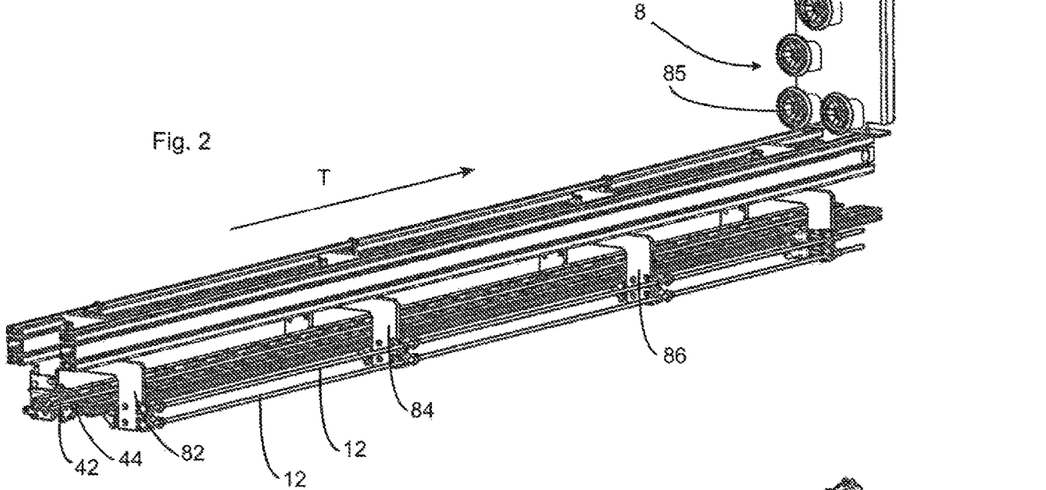

FIG. 2 shows a transport device according to the invention. Here too, adjustment units 82, 84, 86 are provided, which are arranged one behind the other in the transport direction T of the plastic preforms. The reference sign 8 indicates an adjustment device in its entirety. This adjusting device has a total of four manually operated actuating elements. By means of these actuating elements, different settings can be made, e.g. the guide rails 42, 44 can be moved, or lower guide rails can be moved, or the position of a downholder element can be adjusted.

The reference signs 12 refer to coupling elements which couple the individual adjustment units 82, 84 and 86 with each other. In this way, all adjustment units 82, 84 and 86 or the suspension points of the guide rails 42 and 44 can be adjusted together by means of the actuating elements.

Figure 3:
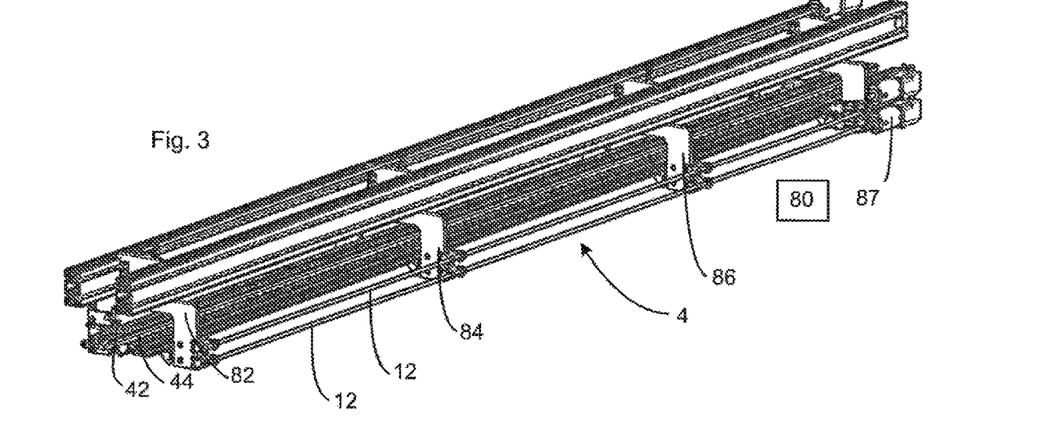
FIG. 3 shows an illustration of a transport device according to the invention with motorised adjustment facility.

FIG. 3 shows a further design of a transport device according to the invention. Instead of the actuating elements 85, motorised drives 87 are provided here, each of which is coupled to the coupling elements 12. These motors can thus take over a motorised adjustment of the individual elements of the transport device 4.

In addition, a control unit 80 (only shown schematically) can be provided to coordinate the individual motors 87. In this way, for example, a new recipe can be selected fully automatically or new plastic preforms can be entered and on the basis of this recipe the individual motors 87 can be controlled automatically and take over a complete adjustment of all guide elements, i.e. for example the guide rails 42 and 44 as well as the downholder element.

Figure 4:
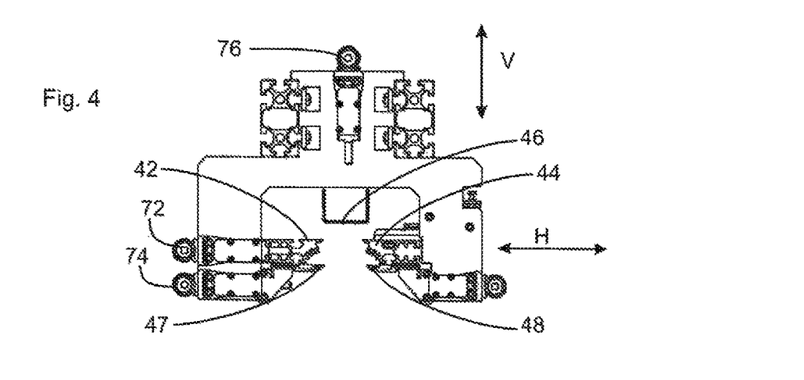
FIG. 4 shows a sectional view of the transport device shown in FIG. 3.

FIG. 4 shows a further representation of an apparatus according to the invention. Here again, the two support rails 42 and 44 are visible. It can be seen that these guide rails 42 and 44 can be adjusted by means of drives, for example, they can be shifted in the horizontal direction H in order to achieve an adjustment to different geometries of plastic preforms. The downholder element 46 can be adjusted especially in the vertical direction V, in order to achieve an adjustment to different thread heights of the plastic preforms, for example.

The reference signs 47 and 48 show guide elements for guiding the base body of the plastic preforms. Reference signs 72, 74 and 76 indicate linkage means by means of which, for example, a shaft can be linked in order to achieve a spindle drive which causes the actual adjustment of the guide elements. With the design shown in FIG. 4 it is possible that the guide element 48 or its movement is coupled to the movement of the support rail 44. However, a separate control would be possible.

Figure 5:
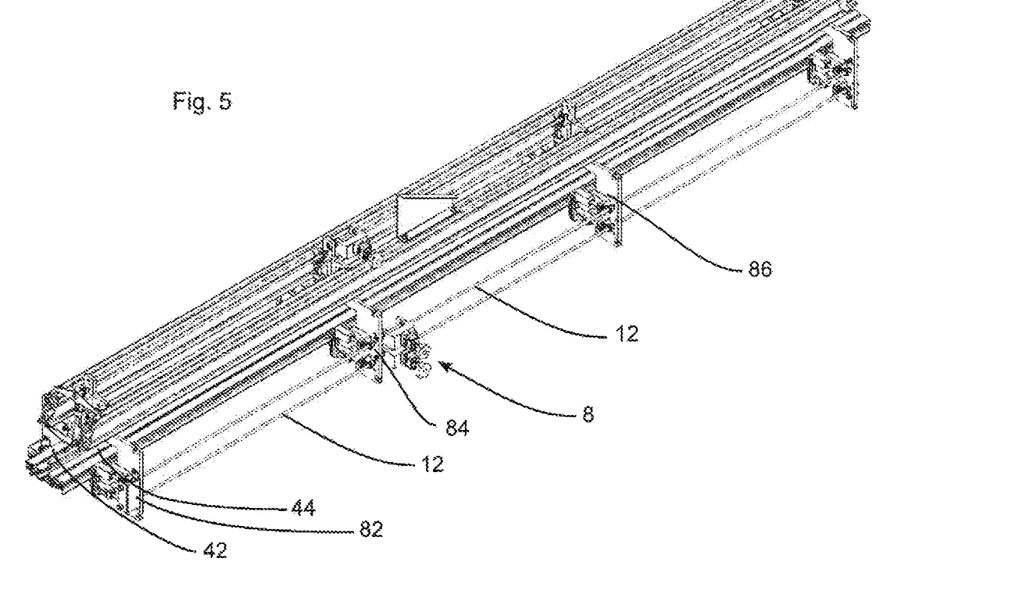
FIG. 5 shows a further representation of a transport device according to the invention.

FIG. 5 shows a further design of a transport device according to the invention. Here again, the three adjustment units 82, 84 and 86 are visible, which are coupled with each other via a rod 12. The reference sign 8 indicates the adjustment mechanism with which all adjustment units 82, 84 and 86 or the respective support rails and also guide elements can be adjusted centrally.

FIG. 6 again shows a sectional view of the transport device shown in FIG. 5. Again, the rails 42 and 44 are visible here. The reference sign 73 indicates a rotatable actuating element, which drives a gearwheel 75, this in turn drives a wheel 78 and another gearwheel 77. A spindle drive is coupled to the gearwheel 77, with which the transverse movement of the support rails 42 can ultimately be achieved. Via a further actuating element, a movement of the guide element 47 can be achieved accordingly.

Figure 6:
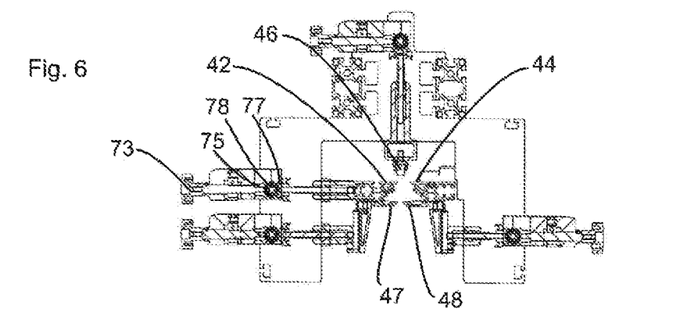
FIG. 6 shows a sectional view of the transport device shown in FIG. 5.

Accordingly, a vertical movement of the downholder element 46 can also be achieved, as shown in FIG. 6.

As mentioned above, the rod or the rotating rod 12 can be attached via the respective gearwheels and in this way, as mentioned above, several adjustment units can be operated simultaneously.

Figure 7:
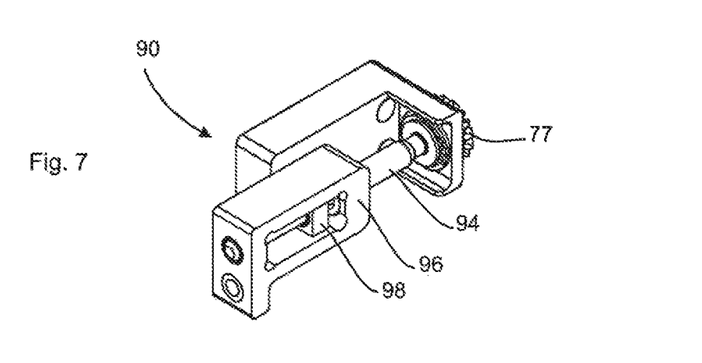
FIG. 7 shows an illustration of an actuator for a transport device according to the invention.

FIG. 7 shows a detailed representation of an actuator 90 In this case the gearwheel 77 is visible, which drives a shaft 94. The reference sign 98 indicates a spindle drive, which ultimately causes the horizontal adjustment of, for example, the support rail 42 or 44. The reference sign 96 identifies a corresponding carrier of this spindle drive.

Figure 8:
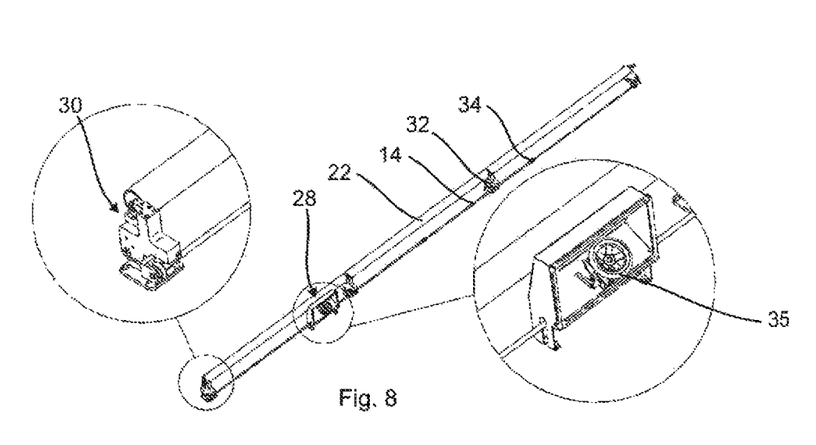
FIG. 8 shows a partial representation of a sorting device.

FIG. 8 shows a representation of part of the sorting device, in particular one of the rotatable rollers 22. This rotatable rollersh can be moved laterally, i.e. perpendicularly to its direction of rotation, by means of an adjustment unit 28. The reference sign 14 again identifies a rotating shaft which is responsible for this adjustment. The reference sign 34 indicates a connecting element with which sections of this shaft can be connected to each other.

The reference sign 30 identifies in its entirety the adjustment element with which the roller 22 can be moved. For this purpose, the roller 22 can be mounted on a slide, which in turn is arranged moveable for example in the horizontal direction in relation to a support. Again, a spindle drive (not shown in detail) can be provided to effect this adjustment.

The reference sign 35 identifies an actuating element, such as a rotatable wheel, with which the adjustment can be performed centrally. This actuating element 35 can, for example, act on the support or element 30 as well as on the support or element 32 to allow parallel displacement of the entire roller.

Figure 9:
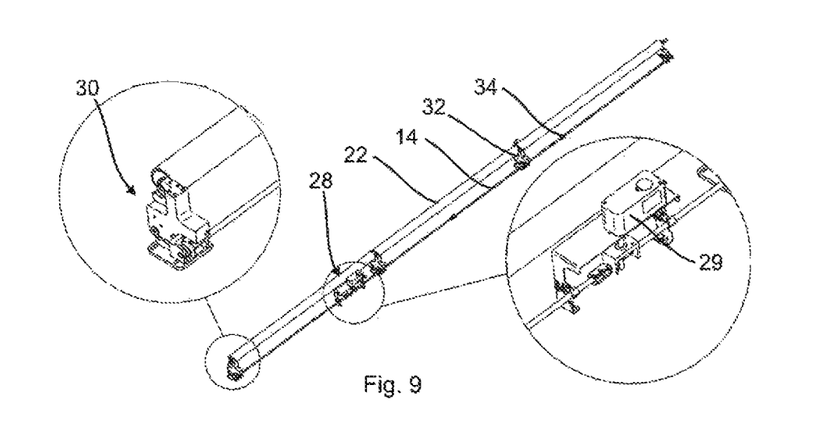
FIG. 9 shows a further partial representation of a sorting device.

On the device shown in FIG. 9, the actual adjustment is correspondingly constructed as shown in FIG. 8. Instead of an actuating element 35, however, a motorised drive 29 is provided here, which in turn causes the shaft 14 to rotate and thus the entire roller to be adjusted.

Figure 10:
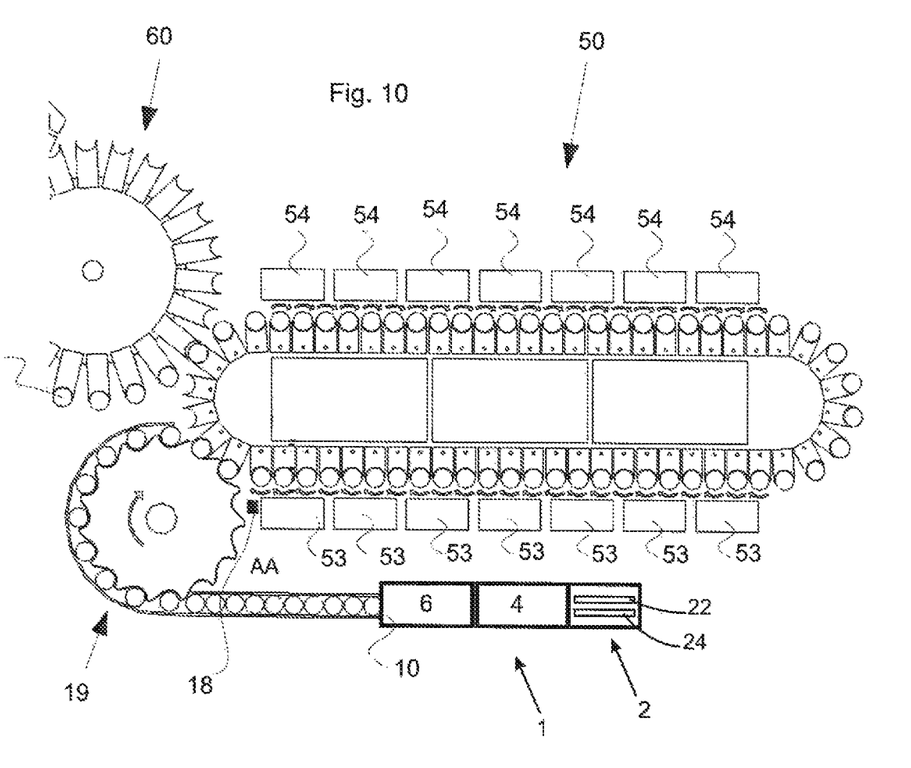
FIG. 10 shows an illustration of a device for forming plastic preforms into plastic containers with an apparatus according to the invention.

FIG. 10 shows an illustration of a device for the treatment of plastic preforms according to the invention. The plastic preforms are first sorted and transported with the apparatus 1 according to the invention. The reference sign 19 indicates a single-position device which spaces the plastic preforms and thus feeds them in this space state to a heating device 50. This heating device also has a transport device which transports the plastic preforms 10 and in particular transports them past heating elements 53 and 54 in order to heat them. The heating device is followed by a further transport device 60, such as a transfer starwheel, which finally feeds the plastic preforms to a device for forming plastic preforms into plastic containers. The reference mark 18 indicates a temperature measuring device which determines an input temperature of the plastic preforms.

As shown here, the sorting device 2 has two rollers 22 and 24, which are arranged parallel to each other and between which the plastic preforms can be conveyed.

The applicant reserves the right to claim all features disclosed in the application documents as being essentially inventive, provided that they are, individually or in combination, new compared to the prior art. It is further pointed out that the individual figures also describe features which may be advantageous in themselves. The skilled person recognises immediately that a certain feature described in a figure can be advantageous even without adopting further features from this figure. Furthermore, the skilled person recognises that advantages may also result from a combination of several features shown in individual or different figures.

LIST OF REFERENCE SIGNS 1 apparatus
2 sorting device
4 transport device
8 adjustment device
10 plastic preforms
12 coupling elements
12 rotatable rod
14 rotatable shaft
18 temperature measuring device
19 single-position device
22 rotatable rollers
24 roller
28 adjustment unit
29 motor drive
30 adjustment element
32 element
34 connecting element
35 actuating element
42 guide rail, support rail
44 guide rail, support rail
46 downholder element
47 guide element
48 guide element
50 heating device
53 heating element
54 heating element
60 transport device
72 linkage means
73 rotatable actuating element
74 linkage means
75 gearwheel
76 linkage means
77 gearwheel
78 gearwheel
80 control device
82 adjustment unit
84 adjustment unit
85 actuating elements
86 adjustment unit
87 engines
94 shaft
96 carrier of the spindle drive
98 spindle drive
120 actuators
182 adjustment element; guide rail
184 adjustment element; guide rail
186 adjustment element; downholder element
T transport direction of the plastic preforms
H horizontal direction
V vertical direction

The invention claimed is:

1. An apparatus for transporting plastic preforms, having a sorting device which is configured for sorting plastic preforms and which transports the plastic preforms in a predetermined transport direction, and having a transport device arranged after the sorting device in the transport direction, wherein said transport device comprises a first support rail for carrying the plastic preforms and a second support rail for carrying the plastic preforms, and the plastic preforms are transportable between said first support rail and said second support rail, wherein said support rails extending in transport direction, wherein the sorting device having two rollers which are spaced apart from one another and between which the plastic preforms can be guided,
wherein
the apparatus has an adjustment mechanism configured for adjusting at least one lateral spacing of the support rails, wherein the adjustment mechanism comprises several adjustment units, which are arranged one behind the other along the transport direction, wherein the adjustment units each enable adjustment of the lateral spacing and wherein the adjustment units are mechanically coupled to one another such that the adjustment units can be adjusted together, and also the rollers of the sorting device are adjustable with respect to each other, wherein the sorting device having a drive device for adjusting the rollers and an adjustment mechanism for adjusting the rollers and an adjustment mechanism for adjusting the guide rails are coupled together, and also the rollers of the sorting device are adjustable with respect to each other, wherein the sorting device has a drive device for adjusting the rollers and an adjustment mechanism for adjusting the rollers and an adjustment mechanism for adjusting the guide rails are coupled together.

2. The apparatus according to claim 1,
wherein
the adjustment units are coupled to each other by at least one mechanical coupling device.

3. The apparatus according to claim 2
wherein
the coupling device comprises at least one rod-like body which is rotatable and/or displaceable along its longitudinal direction.

4. The apparatus according to claim 1
the apparatus has a drive device configured for driving the adjustment units.

5. The apparatus according to claim 1, wherein
the transport device has a downholder element which extends at least in sections along the transport direction.

6. The apparatus according to claim 1, wherein
the transport device has guide elements configured for guiding the preform bodies.

7. The apparatus according to claim 6, wherein
guide elements are also adjustable by the adjustment mechanism.

8. The apparatus according to claim 1
a distance between the two rollers of the sorting device is also adjustable.

9. The apparatus according to claim 1, wherein
the support rails, the guide elements and the downholder element are individually adjustable.

10. A method for transporting plastic preforms, wherein the plastic preforms are sorted by a sorting device and transported by a transport device arranged downstream of the sorting device in the transport direction, wherein said transport device comprises a first support rail for carrying the plastic preforms and a second support rail for carrying the plastic preforms, and the plastic preforms are transported between said first support rail and said second support rail, wherein said support rails extend along the transport direction, wherein the sorting device comprises two rollers spaced from each other between which the plastic preforms are transported
wherein
the apparatus comprises an adjustment mechanism configured for adjusting at least one lateral spacing of the support rails, wherein the adjustment mechanism comprises several adjustment units which are arranged one behind the other along the transport direction, wherein the adjustment units each enable an adjustment of the lateral spacing and wherein the adjustment units are mechanically coupled to one another in such a way that the adjustment units can be adjusted together, and also the rollers of the sorting device are adjustable with respect to each other, wherein the sorting device has a drive device for adjusting the rollers and an adjustment mechanism for adjusting the rollers and an adjustment mechanism for adjusting the guide rails are coupled together.

11. The apparatus according to claim 2, wherein the apparatus has a drive device configured for driving the adjustment units.

12. The apparatus according to claim 2, wherein the transport device has a downholder element which extends at least in sections along the transport direction.

13. The apparatus according to claim 2, wherein the transport device has guide elements configured for guiding the preform bodies.

14. The apparatus according to claim 13, wherein guide elements are also adjustable by the adjustment mechanism.

15. The apparatus according to claim 2, wherein a distance between the two rollers of the sorting device is also adjustable.

16. The apparatus according to claim 2, wherein the support rails, the guide elements and the downholder element are individually adjustable.

17. The apparatus according to claim 3, wherein the apparatus has a drive device configured for driving the adjustment units.

18. The apparatus according to claim 3, wherein the transport device has a downholder element which extends at least in sections along the transport direction.

19. The apparatus according to claim 3, wherein the transport device has guide elements configured for guiding the preform bodies.

20. The apparatus according to claim 19, wherein guide elements are also adjustable by the adjustment mechanism.

* * * * *